US012723918B2

(12) United States Patent
Schossig

(10) Patent No.: US 12,723,918 B2
(45) Date of Patent: Sep. 1, 2026

(54) THERMAL RADIATION SOURCE AND METHOD FOR MEASURING THE EXACT TEMPERATURE AND/OR RADIATED RADIANT FLUX OF THE THERMAL RADIATION SOURCE

(71) Applicant: Infrasolid GmbH, Dresden (DE)

(72) Inventor: Marco Schossig, Dresden (DE)

(73) Assignee: Infrasolid GmbH, Dresden (DE)

( * ) Notice: Subject to any disclaimer, the term of this patent is extended or adjusted under 35 U.S.C. 154(b) by 366 days.

(21) Appl. No.: 18/280,349

(22) PCT Filed: Apr. 28, 2022

(86) PCT No.: PCT/EP2022/061320
§ 371 (c)(1),
(2) Date: Sep. 5, 2023

(87) PCT Pub. No.: WO2022/229313
PCT Pub. Date: Nov. 3, 2022

(65) Prior Publication Data

US 2024/0077358 A1 Mar. 7, 2024

(30) Foreign Application Priority Data

Apr. 30, 2021 (DE) ..................... 10 2021 111 260.5

(51) Int. Cl.
*G01J 5/0875* (2022.01)
*G01J 3/10* (2006.01)
*G01J 5/20* (2006.01)

(52) U.S. Cl.
CPC ............ *G01J 3/108* (2013.01); *G01J 5/0875* (2013.01); *G01J 5/20* (2013.01)

(58) Field of Classification Search
CPC .. G01J 3/108; G01J 5/0875; G01J 5/20; G01J 3/0256; A61F 2007/0086; A61F 2007/0088; A61F 7/00; A61F 7/007; G01K 1/14
(Continued)

(56) References Cited

U.S. PATENT DOCUMENTS 3,694,624 A 9/1972 Buchta
5,391,875 A 2/1995 Cederberg et al.
(Continued)

FOREIGN PATENT DOCUMENTS

CN 101448549 A * 6/2009
CN 112261749 1/2021
(Continued)

OTHER PUBLICATIONS

Ott et al., "Convective losses of thermal infrared emitters with cantilevered heating elements," *Sensors and Actuators A: Physical*, 2018, 279. Jg. pp. 416-423.
(Continued)

*Primary Examiner* — Peter J Macchiarolo
*Assistant Examiner* — Mireille S Sadate-Moualeu
(74) *Attorney, Agent, or Firm* — GREENBLUM & BERNSTEIN, P.L.C.

(57) ABSTRACT

The invention relates to a thermal radiation source which comprises a housing, an electrically operated radiation element arranged in the housing and an exit window through which radiation emitted by the radiation element is emitted from the housing, and to two methods for measuring the temperature of an exit window of the thermal radiation source and/or the radiant flux through an exit window of radiation emitted by the thermal radiation source. The problem of developing a possibility of being able to measure the radiant flux emitted by a thermal radiation source and/or the
(Continued)

surface temperature of the exit window is solved by virtue of the exit window having a pass region, a contacting region and a measurement region, the measurement region and the pass region being formed separately from one another and/or with a partial overlap, with a temperature and/or radiation sensor being arranged within the measurement region of the exit window, the temperature and/or radiation sensor being electrically contacted via the contacting region.

19 Claims, 5 Drawing Sheets

(58) Field of Classification Search
USPC .......................................................... 374/208
See application file for complete search history.

(56) References Cited

U.S. PATENT DOCUMENTS

| | | | | |
|---|---|---|---|---|
| 8,859,303 | B2 | 10/2014 | Udrea et al. | |
| 2004/0133084 | A1* | 7/2004 | Rule | B01L 3/508 600/310 |
| 2008/0272389 | A1* | 11/2008 | Rogne | G01J 3/108 257/E33.044 |
| 2010/0213500 | A1 | 8/2010 | Rogne et al. | |
| 2016/0361449 | A1 | 12/2016 | Omrane | |
| 2019/0246457 | A1 | 8/2019 | Aoki et al. | |

FOREIGN PATENT DOCUMENTS

| | | | | |
|---|---|---|---|---|
| DE | 198 07 453 | | 8/1999 | |
| DE | 10 2004 053012 | | 5/2006 | |
| DE | 102004053012 | A1 * | 5/2006 | H05B 3/748 |
| DE | 10 2018 101 974 | | 8/2019 | |
| DE | 10 2019 109 842 | | 10/2020 | |
| EP | 1 789 760 | | 5/2007 | |
| EP | 3 647 778 | | 5/2020 | |

OTHER PUBLICATIONS

Int'l Search Report (Form PCT/ISA/210) conducted in Int'l Appln. No. PCT/EP2022/061320 (Aug. 10, 2022).

Int'l Written Opinion (Form PCT/ISA/237) conducted in Int'l Appln. No. PCT/EP2022/061320 (Aug. 10, 2022).

Goldberg et al., "Monolithic Ceramic IR-Emitter in Multilayer Technology,": 22nd European Microelectronics and Packaging Conference & Exhibition (EMPC), Pisa, Italy, 2019, pp. 1-7, doi: 10.23919/EMPC44848.2019.8951833.

German Office Action conducted in counterpart German Appln. No. 10 2021 111 260.5 (Aug. 5, 2025).

Europe Office Action conducted in counterpart Europe Appln. No. 22726085.8 (Jul. 28, 2025).

* cited by examiner (a)

(b)

(c)

(a)

(b)

THERMAL RADIATION SOURCE AND METHOD FOR MEASURING THE EXACT TEMPERATURE AND/OR RADIATED RADIANT FLUX OF THE THERMAL RADIATION SOURCE

The invention relates to a thermal radiation source which comprises a housing, an electrically operated radiation element arranged in the housing, and a homogeneous exit window through which radiation emitted by the radiation element is emitted from the housing.

The invention also comprises two methods for measuring the temperature of an exit window of the thermal radiation source according to the invention and/or the radiant flux of emitted radiation of the thermal radiation source according to the invention through an exit window.

Thermal radiation sources are used above all in analytics and metrology, for example, to detect the concentration of materials (gases, liquids, solids). A further large area of use is medical technology for the treatment and relief of diseases and injuries. In all applications, accurate knowledge of the emitted radiant flux or radiation dose of the radiation element of the thermal radiation source is necessary to be able to carry out exact, reproducible, and long-term stable measurements or defined treatments. The radiant flux $P_s$ of a thermal radiation source is essentially dependent on its temperature T and is described by the Stefan-Boltzmann law:

$$P_S = \sigma \cdot \varepsilon \cdot A \cdot T^4$$

using the Stefan-Boltzmann constant σ and the emissivity ε and the area A of the radiation source.

The wavelength $\lambda_{max}$, at which the maximum of the emission lies and by which the spectral distribution is determined, is also dependent on the temperature T of the radiation source and is described by Wien's displacement law:

$$\lambda_{max} = \frac{2897.8\ \mu\text{m} \cdot \text{K}}{T}.$$

In addition, it is of great importance above all in medical and therapeutic applications to also know the temperature of the exit window in addition to the radiation dose, so that the skin cannot be burned in the event of direct skin contact.

A thermal radiation source 1 essentially consists of an electrically operated radiation element 2, for example a heating conductor element, which is arranged in a housing 3, wherein the radiation of the radiation element is emitted from the housing 3 through an exit window 4 (FIG. 1). The radiation or heating conductor element 2 is typically heated in this case to a temperature >500° C. in order to generate a broad emission spectrum in the infrared spectral range. Significantly higher temperatures of >1000° C. are necessary for applications in the visible and near infrared range. I.e., the temperature can be regulated depending on the application and area of use to achieve a desired emission spectrum using the thermal radiation source.

Silicon-based MEMS components having integrated temperature sensors are known from the prior art, for example, from U.S. Pat. No. 5,391,875 A, by which the temperature of the Si chip can be measured. This is described in U.S. Pat. No. 8,859,303 B2 for a thermal infrared radiation source, for example. With the aid of the integrated temperature sensor, the temperature of the radiation source is measured, by which a regulation of the temperature of the radiation source is possible. The emitted radiant flux is estimated thereby and attempts are made to keep it constant via the relationships of the radiation laws. However, an exact determination of the radiant flux actually emitted from the housing of the radiation source is not possible thereby, and nor is it possible to monitor appearances of aging of the radiation source. For example, the three-dimensional emission characteristic of thermal radiation sources has the result that a part of the emitted radiation remains captured in the housing. Changes of the emissivity, for example, due to oxidation or aging, also result in a change of the radiant flux.

An electron-beam sterilization device for sterilizing a packaging container by irradiation using electrons from an electron-beam source is known from US 2016/0361449 A1. For a reliable sterilization, a minimum electron energy or beam intensity of the electrons of the electron-beam source has to be ensured, wherein the emitted electrons generate temperatures in the range of 300° C. to 400° C. at the exit window of the device. The emitted energy or beam intensity of the electrons from the electron-beam source is determined via a measurement of the temperature within the housing or at the exit window of the device. The complex construction of the exit window from copper ribs and a metal foil spanning the copper ribs having a permeability for electrons, but not for electromagnetic radiation, is disadvantageous. The thermocouples used for measuring the temperature are arranged on the copper ribs or the metal foil and are covered using a material which is capable of generating heat when it is subjected to electrons. The temperature detected by the thermocouples is used for the determination of the beam intensity of the emitted electrons of the electron-beam source, i.e., the thermocouples have to be arranged in the electron beam. Due to the higher heat capacity of the thermocouples used in comparison to the heat capacity of the metal foil, which is only 4 to 12 μm thick, no direct measurement of the temperature of the exit window takes place. The radiant intensity of a thermal radiation source cannot be measured using the device from US 2016/0361449 A1, since the thermal radiation would be reflected at the (metallic) exit window.

A device for generating thermal radiation for medical and therapeutic applications, such as healing insect bites, is described in DE 198 07 453 A1. A burn of the skin is achieved here by a displaceable protective jacket for maintaining a safety interval. A measurement of the radiant flux or radiation dose and/or the temperature of the contact surface, i.e., an exit window, does not take place. An optimum and dosed treatment is not possible using this design. Moreover, there is a risk of burning if the safety interval is set incorrectly.

In summary, up to this point no device for an integrated solution is known which enables a measurement of the radiant flux or radiation dose emitted by a thermal radiation source and/or which enables a measurement of the surface temperature of the exit window of a thermal radiation source.

It is therefore an object of the present invention to provide a possibility which can measure the emitted radiant flux or radiation dose from a thermal radiation source and/or can measure the surface temperature of the exit window of such a thermal radiation source.

The object is achieved by a thermal radiation source according to independent claim 1.

The thermal radiation source according to the invention comprises a homogeneous exit window, wherein the exit window includes a transmitting area, a contacting area, and a measuring area, wherein the measuring area and the transmitting area are formed separately from one another and/or partially overlapping, wherein a temperature and/or radiation sensor for measuring the temperature of the exit window is arranged within the measuring area of the exit window, wherein the temperature and/or radiation sensor is electrically contacted via the contacting area of the exit window.

A homogeneous exit window is understood as an exit window which has a homogeneous thickness in the range of 200 μm to 2 mm and has a significantly higher heat capacity than a temperature and/or radiation sensor used.

The advantage over previously known solutions is in particular that the radiant flux actually emitted from the housing of the radiation source or the temperature of the exit window is measured and can thus be regulated and monitored.

This is achieved in particular in that the exit window of the thermal radiation source according to the invention is divided into three different functional areas, a transmitting area, a contacting area, and a measuring area. The transmitting area identifies the functional area of the exit window from which the radiation emitted by the radiation element of the thermal radiation source is emitted from the housing into the surroundings. The transmitting area should preferably correspond to the size of the radiation element. The measuring area identifies the functional area of the exit window within which the temperature sensor and/or radiation sensor is arranged. The contacting area identifies the functional area of the exit window in which the contacting of the temperature and/or radiation sensor takes place, wherein the contacting area is formed in the edge area of the exit window, where the exit window is in contact with the housing of the thermal radiation source. Upon an observation of its cross section from the inside to the outside, the exit window includes the transmitting area, a measuring area adjoining thereon, and a contacting area in turn adjoining thereon, wherein the transmitting area and the measuring area can be formed separately from one another and/or partially overlapping, however. Partially overlapping within the meaning of the invention means that the measuring area can also be formed in the transmitting area of the exit window, for example, in that a temperature and/or radiation sensor is arranged centrally in the transmitting area, which is contacted via narrow connection tracks, which are led through the transmitting area to the contacting area.

The material of the exit window is preferably sapphire, since sapphire is transparent over a broad wavelength range, and is moreover very robust, chemically inert, and thus also biocompatible. Alternatively, however, other infrared-transmissive materials can be used, e.g., silicon, germanium, calcium fluoride, barium fluoride, or zinc selenide.

A platinum measurement resistor in thin-film technology is preferably used as the temperature and/or radiation sensor in the measuring area of the exit window, because it has a nearly temperature-linear resistance profile and a broad temperature measurement range and can be produced cost-effectively. In principle, however, any other type of temperature or radiation sensor can be used, for example, semiconductor sensors or thermocouples. Indium-tin oxide (ITO), for example, can be used for contacting the temperature and/or radiation sensors in the measuring area, as is used, for example, as a transparent thin-film conductor track in OLEDs. If ITO is used as the material for the conductor tracks on the exit window, the measuring area can be arranged in the middle (or anywhere in space) on the exit window, i.e., partially overlapping with the transmitting area. If the temperature sensor and/or radiation sensor is moreover transparent to the radiation, the measuring area and the transmitting area can then be formed congruent in one variant.

Due to the application of a temperature and/or radiation sensor to the exit window of the thermal radiation source, inter alia, the quality and the reliability of measurements, for example in material analysis, can be improved. The application of a temperature and/or radiation sensor within the measuring area of the exit window is understood in the meaning of the invention to mean that the temperature and/or radiation sensor is applied or arranged, for example, by means of thin-film technology or template/screen printing method, directly to the surface of the exit window or to the exit window, for example, by adhesive bonding. Appearances of aging of the radiation source may thus also be monitored better. In medical and therapeutic applications, the radiation dose may be exactly measured and matched to the treatment. Burns in applications with skin contact may be avoided by the measurement of the surface temperature of the exit window, or applications with skin contact become possible in a beneficial manner for the first time by this means. This increases the reliability of the medical devices and ensures optimum treatment. In applications in analytics and metrology, for example in gas analysis, moreover, temperature-dependent spectral shifts of the transmission properties of the exit window, in particular at filter edges, may be determined and quantified and corrected in the measurement. This increases the measurement accuracy and reliability.

The combination of the thermal radiation source according to the invention with a housing for surface mounting, a so-called SMD housing (surface mount device housing) is particularly advantageous, because a highly integrated component without external contacting, very flat construction, and the possibility of fully automated manufacturing are achieved in this way.

In one embodiment of the thermal radiation source according to the invention, the measuring area is formed enclosed by the transmitting area and the contacting area. I.e., the measuring area is bounded by the transmitting area and the contacting area. The temperature and/or radiation sensor or sensors are arranged here in the measuring area. This has the advantage that the temperature or the radiant flux can be directly measured in the immediate surroundings of the transmitting area of the exit window, where the radiation passes through.

In another embodiment of the thermal radiation source according to the invention, the measuring area is formed congruent with the transmitting area. This has the advantage that the temperature or the radiant flux can be measured directly in the exit window, for example, in the middle of the exit window where the radiation passes through.

In a further embodiment of the thermal radiation source according to the invention, the exit window has a rectangular, square, or round shape. A rectangular or square shape of the exit window is suitable in particular for housings of surface mounting, so-called SMD housings, but also polygonal housing shapes of push-through mounting. A round exit window is preferably used for round housing shapes, for example, with TO housings.

In one preferred embodiment of the thermal radiation source according to the invention, the temperature and/or radiation sensor is formed congruent with the measuring area of the exit window. Congruent in the meaning of the invention means that the temperature and/or radiation sensor is advantageously formed peripherally in the measuring area of the exit window or is formed having the same area as the measuring area, so the temperature and radiant flux can be measured as exactly as possible, i.e., the temperature or radiant flux is detectable in the entire measuring area of the exit window by means of the temperature and/or radiation sensor.

In another advantageous embodiment of the thermal radiation source according to the invention, more than one temperature and/or radiation sensor is arranged within the measuring area of the exit window. Due to the arrangement of more than one temperature and/or radiation sensor, preferably a large number of temperature and/or radiation sensors, it is possible to measure the temperature and/or radiant flux in a location-resolved manner.

In another embodiment of the thermal radiation source according to the invention, the temperature and/or radiation sensor applied in the measuring area of the exit window is arranged within the housing, wherein an electrical wire contact of the temperature and/or radiation sensor is also formed within the housing. An internal arrangement of the temperature and/or radiation sensor in the measuring area of the exit window and its wire contacting in the contacting area has the advantage, inter alia, that all components are protected well from external influences, such as damage. Although the temperature sensor does not directly measure the surface temperature of the external side of the exit window facing toward a (measurement) object with this arrangement and the radiation sensor does not directly detect the radiant flux emitted by the thermal radiation source, which passes through the exit window, both can be corrected by a calibration of the system and by knowing the material properties, such as the transmission and thermal conductivity of the exit window, in the signal processing of the system.

In a further embodiment of the thermal radiation source according to the invention, the temperature and/or radiation sensor arranged in the measuring area of the exit window is arranged outside the housing, wherein an electrical wire contact of the temperature and/or radiation sensor is also formed outside the housing. In this arrangement, the radiant flux emitted by the radiation source, which passes through the exit window, is advantageously detected directly and the surface temperature of the side of the exit window facing toward a (measurement) object is also measured. The temperature and/or radiation sensor in the measuring area of the exit window and its contact wires can be protected from external influences by applying an additional thin passivation and protective layer, for example, made of glass.

In another further embodiment of the thermal radiation source according to the invention, the temperature and/or radiation sensor applied in the measuring area of the exit window is arranged within the housing, wherein an electrical wire contact of the temperature and/or radiation sensor is formed outside the housing. If no space for contact wires is present or this is technologically not compatible with an arrangement of the temperature and/or radiation sensor in the measuring area of the exit window within the housing, an external wire contact can be produced in that the exit window protrudes out of the housing and the contacting area also extends outward, so that the contact is located outside the housing.

In a particularly preferred embodiment of the thermal radiation source according to the invention, a contact of the temperature and/or radiation sensor via contact surfaces attached on the outside to the housing is formed by means of soldering a metallic solder paste and/or by means of conductive adhesive. Using this variant, the implementation of a highly integrated and long-term stable component for automated production in high piece counts is possible, wherein especially the wireless contacting of temperature and/or radiation sensor, for example, by adhesive bonding using a conductive adhesive or soldering using a metallic solder paste, and a housing for surface mounting are advantageous. The electrical contact of the temperature and/or radiation sensor takes place here via matching contact surfaces on the housing for the surface mounting.

In a further preferred embodiment of the thermal radiation source according to the invention, the temperature and/or radiation sensor applied in the measuring area of the exit window is arranged outside the housing, wherein an electrical contact of the temperature and/or radiation sensor is formed via contact surfaces, which are on a holder connected to the thermal radiation source. The thermal radiation source is fastened on a holder or installation device having contact surfaces which can be soldered and is electrically contacted by means of solder paste or conductive adhesive in the contacting area. The holder can be, for example, a circuit board or another housing or something similar. This has the advantage that the electrical contacts are protected from damage and other external environmental influences and only the measuring area of the exit window has to be covered using a passivation and protective layer.

In another embodiment of the thermal radiation source according to the invention, a temperature and/or radiation sensor is arranged within the housing applied in the measuring area of the exit window and also a further temperature and/or radiation sensor is arranged outside the housing applied in the measuring area of the exit window, wherein an electrical contact of the temperature and/or radiation sensors is formed by means of a wire contact and/or via contact surfaces attached on the outside on the housing by means of soldering a metallic solder paste and/or by means of conductive adhesive. The two-sided arrangement or integration of temperature and/or radiation sensors in the exit window, thus, on the one hand, on the surface of the exit window facing inward into the housing and also, on the other hand, on the surface of the exit window facing outward out of the housing, has the advantage that temperature differences between inside and outside of the exit window may be measured, by which, for example, the measurement accuracy is increased. In addition, it is thus possible to house a large number of sensor elements on the exit window, for example, to be able to measure the temperature and/or the radiant flux in a location-resolved manner.

In one variant of the thermal radiation source according to the invention, the exit window is formed from silicon or germanium, wherein the temperature and/or radiation sensor is arranged integrated in the measuring area of the exit window in this case. Integrated in this meaning means that the temperature and/or radiation sensor is formed, thus integrated, in the plane of the exit window by means of methods of semiconductor technology.

In a further preferred embodiment of the thermal radiation source according to the invention, the electrical radiation element is formed freestanding, wherein preferably a reflection layer is formed below the radiation element. The radiation element has very good thermal insulation due to a freestanding structure. In combination with a very low thermal mass of the radiation element, due to which it can be electrically modulated well, a maximum efficiency can be achieved. The reflection layer is used to reflect the radiation emitted on the rear side and conduct it through the exit window.

The object is also achieved by a method as claimed in independent claim 17.

The method according to the invention for measuring the temperature of an exit window of a thermal radiation source and/or the radiant flux of an emitted radiation of the thermal radiation source through a homogeneous exit window as claimed in any one of claims 1 to 16 comprises the following method steps in a first variant:

- measuring the temperature of the exit window by means of a temperature and/or radiation sensor, which is arranged applied and/or integrated in the measuring area of the exit window, wherein a first sensor signal is generated;
- detecting an emitted radiation of a thermal radiation element absorbed by the radiation sensor, which is arranged applied and/or integrated in the measuring area of the exit window, wherein a second sensor signal is generated;
- evaluating the sensor signals by forming a mathematical linkage of the first sensor signal of the temperature sensor and/or radiation sensor and the second sensor signal of the radiation sensor, wherein the mathematical linkage indicates the radiant flux.

In the first step, the temperature can be measured by the temperature sensor, which does not detect, i.e., see, radiation. The radiation sensor detects the emitted radiation but can also simultaneously measure the temperature of the exit window. In order to ascertain the radiant flux from the two sensor signals, which are detected either by the temperature sensor and the radiation sensor or only by the radiation sensor, a calibration of the thermal radiation source, as described hereinafter, is absolutely necessary. The calibration takes place once after the production of the component, it is thus not necessary before each measurement. The determination or evaluation of the radiant flux is carried out by a mathematical linkage of the recorded sensor signals. The mathematical linkage can be, for example, a subtraction.

The object is also achieved by a method as claimed in independent claim 18.

In the method according to the invention for measuring the temperature of an exit window of a thermal radiation source and/or the radiant flux of an emitted radiation of the thermal radiation source through a homogeneous exit window as claimed in any one of claims 1 to 16, in a second variant, a radiation change over time is generated by means of an electrical modulation of a radiation element of the thermal radiation source, which causes a temperature change over time in the radiation sensor and/or in the temperature sensor, wherein the radiant flux is ascertained therefrom by means of a calibration.

The calibration comprises, on the one hand, recording the sensor signals at defined temperature values and with the radiation element switched off and, on the other hand, an external contactless temperature measurement of the exit window with radiation element switched on and defined power parameters. In addition, an external measurement of the emitted radiant flux can also be carried out with defined power parameters of the radiation element.

The thermal radiation source according to the invention is provided in particular for use in measuring devices for material and spectral analysis and medical and therapeutic devices for treating diseases and injuries and is suitable and designed for these purposes.

The invention is to be explained in more detail hereinafter on the basis of exemplary embodiments.

In the associated drawings

Figure 4:
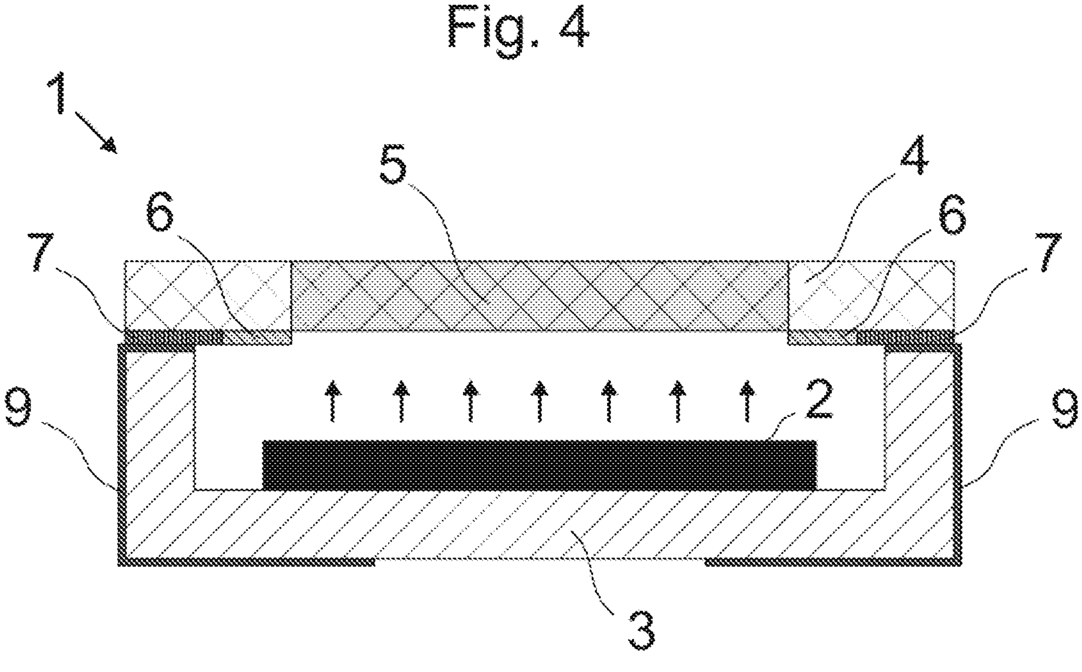
Figure 5:
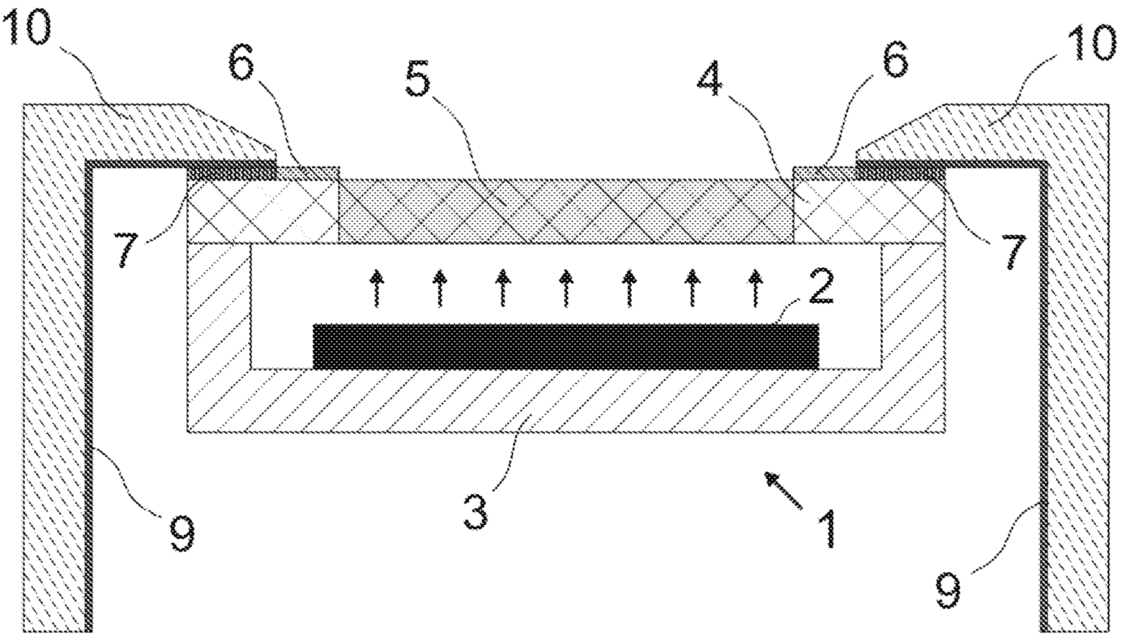
Figure 6:
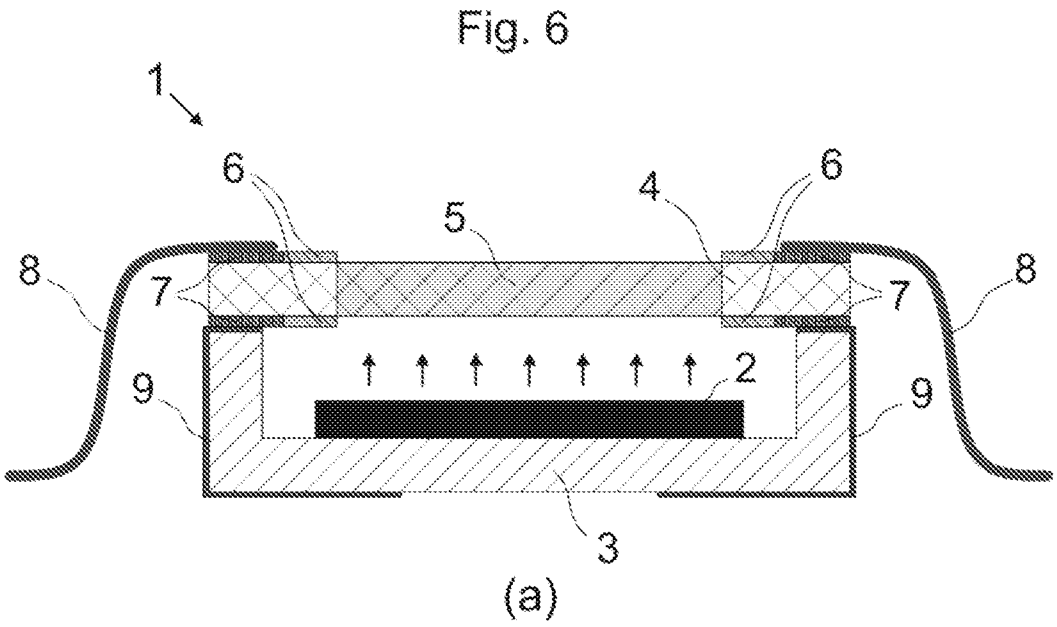
Figure 6:
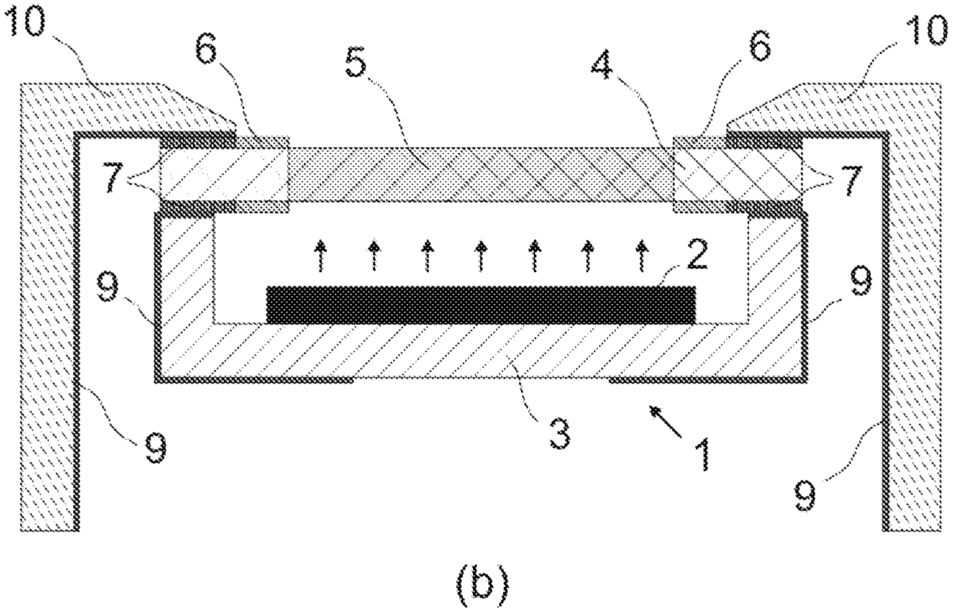
Figure 7:
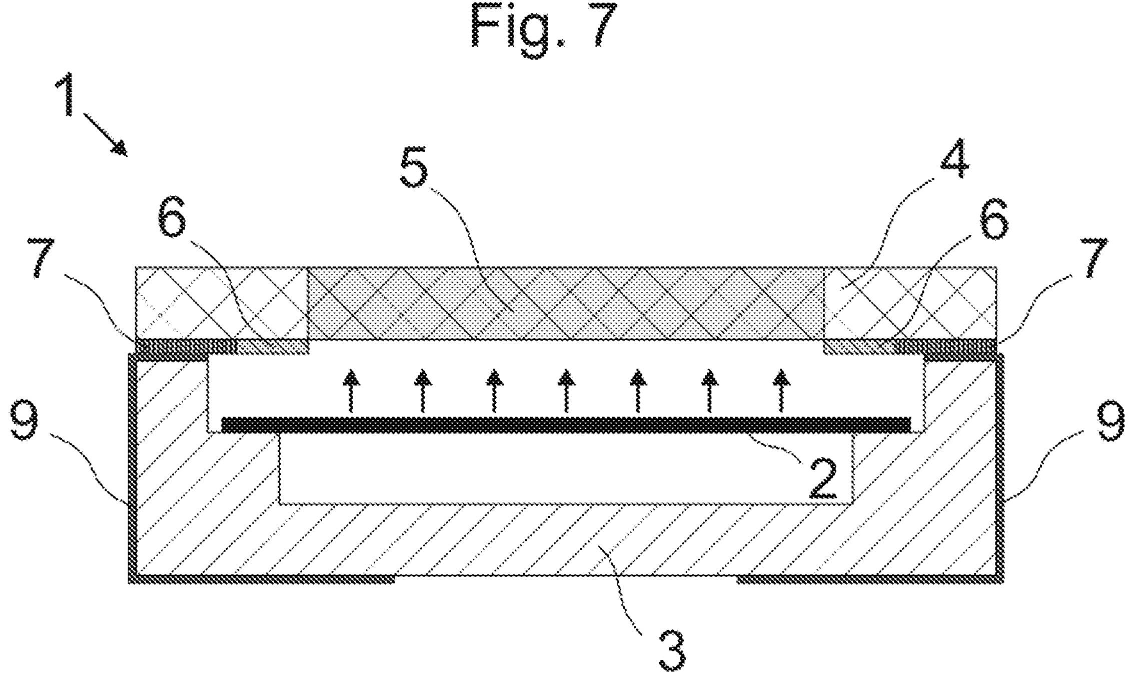

- (a) internal arrangement of the temperature and/or radiation sensor and its wire contact,
- (b) external arrangement of the temperature and/or radiation sensor and its wire contact, and
- (c) internal arrangement of the temperature and/or radiation sensor with external wire contact of the temperature and/or radiation sensor;

FIG. 4 shows a preferred embodiment of the thermal radiation source according to the invention with wireless contacting of the temperature and/or radiation sensor via contact surfaces in a housing for surface mounting;

FIG. 5 shows an embodiment of the thermal radiation source according to the invention with external arrangement of the temperature and/or radiation sensor and a contact via contact surfaces which are formed on a holder;

FIG. 6 shows preferred embodiments of the thermal radiation source according to the invention with two-sided arrangement of a temperature and/or radiation sensor inside and outside the housing in the measuring area of the exit window:

- (a) with external wire contact and a contact via contact surfaces on the housing;
- (b) with a contact via contact surfaces on the housing and contact surfaces which are formed on a holder that is connected to the thermal radiation source;

FIG. 7 shows a preferred embodiment of the thermal radiation source according to the invention having a thin, freestanding radiation element of the thermal radiation source.

Figures 1, 2:
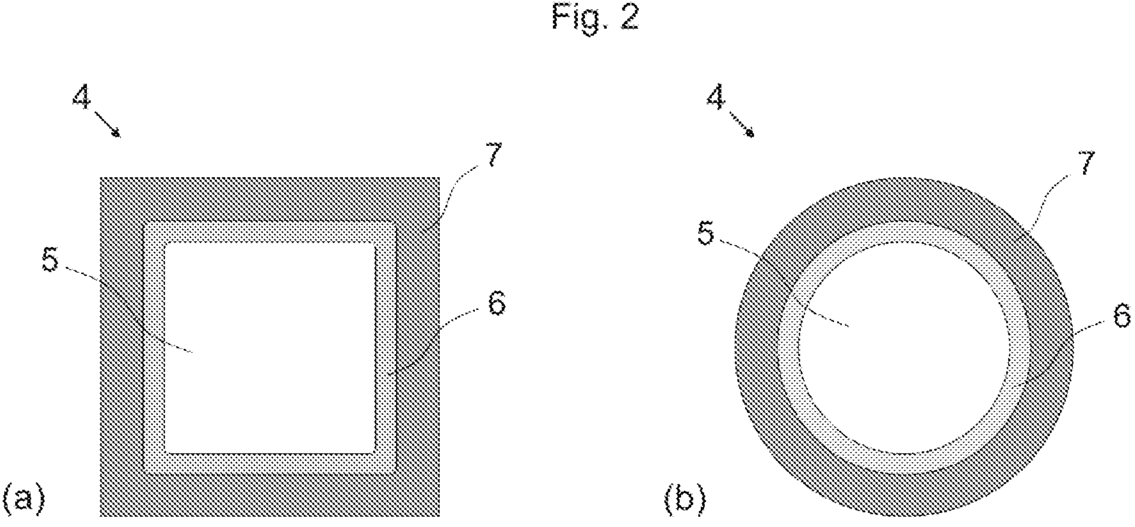
FIG. 1 shows a schematic structure of a thermal radiation source according to the prior art.
FIG. 2 shows preferred embodiments of the exit window of the thermal radiation source according to the invention: (a) rectangular/square shape and (b) round shape.

FIG. 2 shows preferred embodiments of the exit window 4 of the thermal radiation source 1 according to the invention. The exit window 4 of the thermal radiation source 1 according to the invention is divided into three different functional areas. The homogeneous exit window 4 includes in one embodiment, upon an observation of the cross section from the inside to the outside, a transmitting area 5, a measuring area 6 adjoining thereon, and a contacting area 7 in turn adjoining thereon. The transmitting area 5 identifies the functional area of the exit window 4 from which the radiation emitted by the radiation element 2 of the thermal radiation source 1 is emitted from the housing 3 into the surroundings. The transmitting area 5 is preferably to correspond to the size of the radiant surface of the radiation element. The measuring area 6 identifies the functional area of the exit window 4, within which the temperature sensor and/or radiation sensor is arranged applied and/or integrated, wherein the measuring area 6 is formed in one embodiment between the transmitting area 5 and the contacting area 7. The contacting area 7 identifies the functional area of the exit window 4 in which the contacting of the temperature and/or radiation sensor takes place, wherein the contacting area 7 is formed in the edge area of the exit window 4, where the exit window 4 is in contact with the housing 3 of the thermal radiation source 1. A rectangular or square shape of the exit window 4, as shown in FIG. 2(*a*) is suitable in particular for housings of surface mounting (so-called SMD housings), but also polygonal housing shapes of the push-through mounting. A round exit window 4, as shown in FIG. 2(*b*), is preferably used in round housing shapes, such as TO housings. The temperature sensor and/or radiation sensor is housed here in the measuring area 6 on the exit window 4 such that preferably a round or rectangular transmitting area 5 for the passage of the radiation results in the middle of the exit window 4. The contacting of temperature and/or radiation sensor takes place in the contacting area 7, which is in the edge area of the exit window 4, where this is in contact with the housing 3. The temperature and/or radiation sensor is preferably formed peripherally in the measuring area 6 of the exit window 4, so that temperature and radiant flux can be exactly measured. However, it is also possible to arrange a large number of temperature and/or radiation sensors in the measuring area 6 of the exit window 4 in order to implement a location-resolved temperature or radiant flux measurement.

In another exemplary embodiment, the temperature and/or radiation sensor is arranged, for example, in the form of a platinum (Pt) resistor in the middle of the exit window. The electrical contact takes place, for example, via ITO conductor tracks, which are led from the Pt resistor to the contacting area at the edge of the exit window. A Pt resistor is implementable very small in comparison to the transmitting area of the exit window, so that it does not influence the emitted radiation of the radiation element. The temperature or radiant flux can thus be measured directly in the middle of the exit window.

Figure 3:
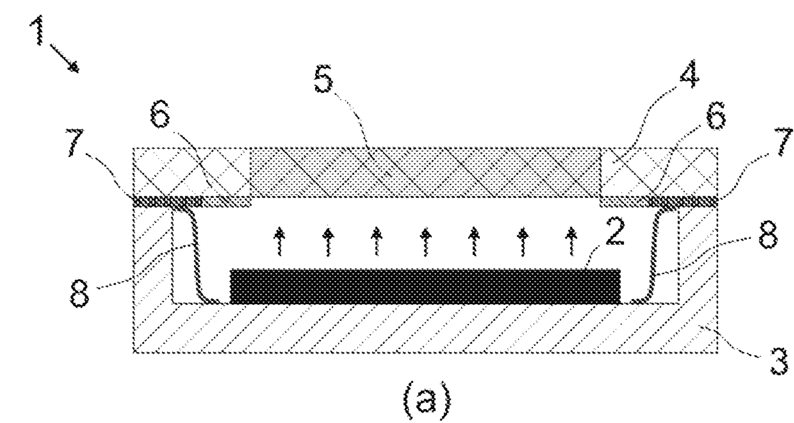
FIG. 3 shows exemplary embodiments of the thermal radiation source according to the invention having temperature and/or radiation sensor applied in the measuring area of the exit window.
Figure 3:
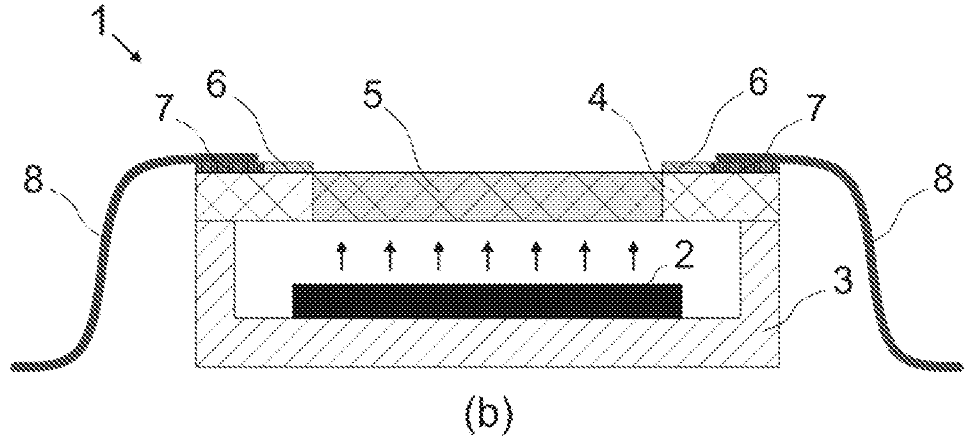
Figure 3:
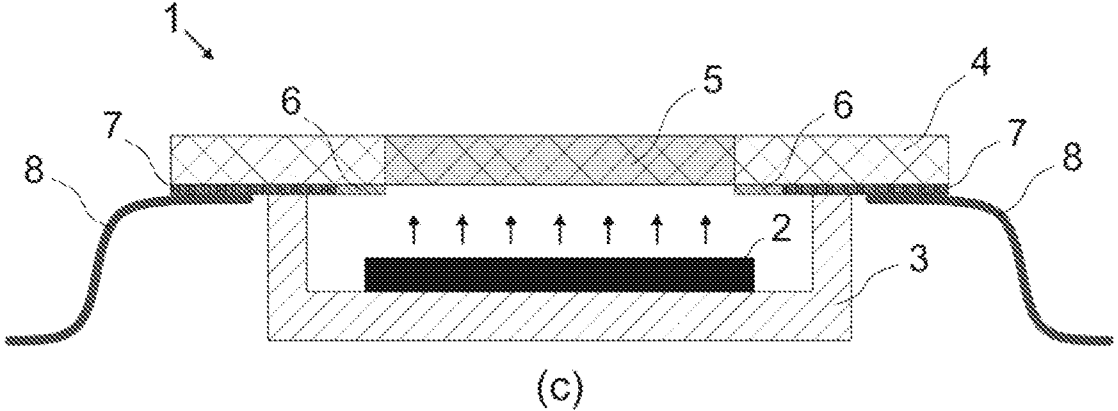

FIG. 3 shows possible embodiments of the thermal radiation source 1 according to the invention having temperature and/or radiation sensor applied in the exit window 4 in the measuring area 6 of the exit window 4 and a wire contact 8 in the contacting area 7 of the exit window 4. An internal arrangement of temperature and/or radiation sensor in the measuring area 6 of the exit window 4 and its wire contact 8 in the contacting area 7 of the exit window 4, as shown in FIG. 3(*a*) has the advantage, inter alia, that all components are well protected from external influences, such as damage. Due to the internal arrangement of the temperature sensor, it cannot directly measure the surface temperature of the external side of the exit window 4, which faces toward a (measurement) object, and the radiation sensor cannot directly detect the radiant flux emitted by the thermal radiation source 1. Both can be corrected, however, by a calibration of the system and by knowledge of the material properties, such as the transmission and thermal conductivity of the exit window 4, in the signal processing of the system.

Alternatively, the temperature and/or radiation sensor in the measuring area 6 of the exit window 4 and its contacting wires 8 in the contacting area 7 can be arranged outside the housing 3, as shown in FIG. 3(*b*). In this arrangement, the radiant flux emitted by the thermal radiation source 1 is advantageously directly detected and also the surface temperature of the side of the exit window 4 facing toward a (measurement) object is measured. The temperature and/or radiation sensor in the measuring area 6 of the exit window 4 and its contact wires 8 can be protected from external influences by the application of an additional thin passivation and protective layer made of glass, for example. If, with an internal arrangement of the temperature and/or radiation sensor in the measuring area 6 of the exit window 4 inside the housing 3, no space is present for contact wires 8 or this is not technologically compatible, an external wire contact 8 can take place such that the exit window 4 protrudes above the housing 3 and the contacting area 7 also extends outward, as shown in FIG. 3(*c*).

A particularly preferred embodiment of the thermal radiation source 1 according to the invention is shown in FIG. 4. To be able to implement a highly integrated and long-term stable component for automated production in high piece counts, a wireless contact of the temperature and/or radiation sensor, for example, by adhesive bonding using a conductive adhesive or by means of soldering using a metallic solder paste, and a housing 3 for surface mounting are advantageous. The electrical contact of the temperature and/or radiation sensor takes place here via matching contact surfaces 9 on the housing 3 for the surface mounting.

FIG. 5 shows a further preferred embodiment of the thermal radiation source 1 according to the invention having a wireless contact with an external temperature and/or radiation sensor, i.e., arranged outside the housing 3, in the measuring area 6 of the exit window 4. In this case, the thermal radiation source 1 is fastened on a holder 10 having contact surfaces 9 which can be soldered and is electrically contacted by means of solder or conductive adhesive in the contacting area 7 of the exit window 4. The holder can be, for example, a circuit board or another housing or something similar. This embodiment has the advantage that the electrical contacts are protected from damage and other external environmental influences and only the measuring area 6 of the exit window 4 has to be covered using a passivation and protective layer.

FIG. 6 shows a further embodiment of the thermal radiation source 1 according to the invention having two-sided arrangement of the temperature and/or radiation sensors on or in the measuring area 6 of the exit window 4. The contacting of the sensors can either take place wirelessly via contact surfaces 9 (FIG. 6(*b*)), by means of contact wires 8, or in a combined manner (FIG. 6(*a*)). This has the advantage that temperature differences between inside and outside of the exit window 4 may be measured, by which, for example, the measurement accuracy is increased. In addition, it is thus possible to house a large number of sensor elements in the measuring area 6 of the exit window 4, in order to be able to measure the temperature and/or the radiant flux in a location-resolved manner, for example.

FIG. 7 shows a further preferred embodiment of the thermal radiation source 1 according to the invention, wherein the radiation element or heating element 2 has a very low thermal mass so that it can be electrically modulated well and has very good thermal insulation due to a freestanding structure, so that a maximum efficiency is achieved.

The temperature and/or radiation sensor can be used for the measurement of the actual temperature of the exit window. A platinum measurement resistor in thin-film technology is preferably used here as the temperature sensor and radiation sensor. Since both sensors, temperature sensor and radiation sensor, are formed applied and/or integrated in the measuring area of the exit window, the temperature of the exit window can be measured using both sensors.

Two method variants are available according to the invention for the determination of the emitted radiant flux.

In a first method variant, a temperature sensor and a radiation sensor are used for the determination of the radiant flux. The temperature sensor is made mirrored for this purpose, for example, by the application of a thin metal layer. This has the advantage that the radiation incident on the temperature sensor is reflected and is not detected by the temperature sensor, so that the temperature sensor only measures the temperature of the exit window. If the temperature sensor is designed as a platinum measuring resistor, the platinum is used as the mirror layer and fulfills this purpose. Sometimes, it is expedient to protect the temperature sensor by way of a passivation and protective layer, so that a reflection layer in turn has to be applied to the passivation and protective layer since the passivation and protective layer would absorb the radiation under certain circumstances. The temperature sensor supplies a first sensor signal. The radiation sensor, which also consists of platinum, for example, is made highly absorbing for the radiation, in contrast, for example by the application of an absorption layer. The radiation sensor detects the emitted radiation of the thermal radiation element, wherein a second sensor signal is generated. A mathematical linkage, for example, a difference, is formed from the two detected sensor signals, which is ultimately a measure of the emitted radiant flux of the thermal radiation source. By means of the initial calibration described above, a relationship is established between the (uncalibrated) measured and the actual (real) temperature of the exit window or the emitted radiant flux and stored in the signal processing and corrected such that an exact regulation is made possible.

In a second method variant, a temperature sensor or a radiation sensor is used for the determination of the radiant flux. An electrical modulation of the radiation element, which causes a radiation change over time, results in a temperature change over time in the absorbing radiation sensor or in the temperature sensor. Both can be provided with a passivation and protective layer. This temperature change is detectable and therefore the radiant flux is determinable after a calibration. In this method variant, only one sensor element, either a temperature sensor or a radiation sensor, is necessary, wherein the measurement of the temperature of the exit window and the radiant flux is thus possible simultaneously. This second method variant is advantageous with respect to a simple and cost-effective structure. However, this second method variant requires a calibration of the system.

LIST OF REFERENCE NUMERALS

1 thermal radiation source
2 radiation element or heating conductor element/heating conductor chip
3 housing of the radiation source
4 exit window
5 transmitting area of the exit window
6 measuring area of the exit window, in which the temperature and/or radiation sensor is arranged
7 contacting area of the exit window
8 wire contacting/contact wires
9 contact surface for soldering and/or adhesive bonding, wireless contacting
10 holder for thermal radiation source

The invention claimed is:

1. A thermal radiation source comprising:

a housing, an electrically operated radiation element, which is arranged in the housing, and a homogeneous exit window, through which electromagnetic radiation emitted by the radiation element is emitted from the housing, the exit window being arranged at a distance from the radiation element, wherein the exit window includes a transmitting area, a contacting area, and a measuring area, wherein the measuring area and the transmitting area are formed separately from one another or partially overlapping, wherein a temperature sensor and a radiation sensor are arranged within the measuring area of the exit window, the temperature sensor being configured to generate a first signal for measuring a temperature of the exit window, and the radiation sensor being configured to generate a second signal for measuring the radiated radiation power of the radiation element, and wherein the temperature sensor and the radiation sensor are electrically contacted via the contacting area.

2. The thermal radiation source as claimed in claim 1, wherein the measuring area is formed enclosed by the transmitting area and the contacting area.

3. The thermal radiation source as claimed in claim 1, wherein the measuring area is formed congruent with the transmitting area.

4. The thermal radiation source as claimed in claim 1, wherein the exit window has a rectangular, square, or round shape, and wherein the exit window is made of a material such as sapphire or calcium fluoride or barium fluoride or zinc selenide.

5. The thermal radiation source as claimed in claim 4, wherein the exit window has a thickness in a range of 200 μm to 2 mm.

6. The thermal radiation source as claimed in claim 1, wherein the temperature sensor and the radiation sensor are formed congruent with the measuring area of the exit window.

7. The thermal radiation source as claimed in claim 1, wherein more than one temperature sensor and radiation sensor are arranged inside the measuring area of the exit window.

8. The thermal radiation source as claimed in claim 1, wherein the temperature sensor and the radiation sensor are formed as a platinum measurement resistor.

9. The thermal radiation source as claimed in claim 8, wherein at least one of:

the temperature sensor includes a reflection layer and the radiation sensor include an absorption layer, and the temperature sensor and the radiation sensor include a protective and passivation layer.

10. The thermal radiation source as claimed in claim 1, wherein the temperature sensor and the radiation sensor applied in the measuring area of the exit window are arranged inside the housing, and wherein an electrical wire contacting of the temperature sensor and the radiation sensor are also formed inside the housing.

11. The thermal radiation source as claimed in claim 1, wherein the temperature sensor and the radiation sensor applied in the measuring area of the exit window are arranged outside the housing, and wherein an electrical wire contacting of the temperature sensor and the radiation sensor are also formed outside the housing.

12. The thermal radiation source as claimed in claim 1, wherein the temperature sensor and the radiation sensor applied in the measuring area of the exit window are arranged inside the housing, and wherein an electrical wire contacting of the temperature sensor and the radiation sensor are formed outside the housing.

13. The thermal radiation source as claimed in claim 1, wherein a contact of the temperature sensor and the radiation sensor via contact surfaces attached to the housing on the inside or outside is formed by at least one of soldering a metallic solder paste and by conductive adhesive.

14. The thermal radiation source as claimed in claim 1, wherein the temperature sensor and the radiation sensor applied in the measuring area of the exit window are arranged outside the housing, and wherein an electrical contact of the temperature sensor and the radiation sensor is formed via contact surfaces, which are on a holder that is connected to the thermal radiation source.

15. The thermal radiation source as claimed in claim 1, wherein both a temperature sensor and the radiation sensor are arranged applied inside the housing in the measuring area of the exit window and also a further temperature sensor and a further radiation sensor are arranged applied outside the housing in the measuring area of the exit window, wherein an electrical contact of the temperature sensors and the radiation sensors is formed by a wire contact and via contact surfaces attached outside on the housing at least one of by soldering a metallic solder paste and by conductive adhesive.

16. The thermal radiation source as claimed in claim 1, wherein the exit window is made of silicon or germanium, and wherein the temperature and/or radiation sensor is arranged integrated in the measuring area of the exit window.

17. The thermal radiation source as claimed in claim 1, wherein the electrical radiation element is formed freestanding, and wherein a reflection layer is formed below the radiation element.

18. A method for measuring the temperature of an exit window of a thermal radiation source and/or the radiant flux of emitted radiation of a thermal radiation source through a homogeneous exit window as claimed in claim 1, wherein the method comprises:

measuring the temperature of the exit window by a temperature sensor and a radiation sensor are, which is arranged applied and/or integrated in a measuring area of the exit window, wherein a first sensor signal is generated;

detecting emitted radiation of a radiation element, which is absorbed by the radiation sensor, which is arranged applied and/or integrated in a measuring area of the exit window, wherein a second sensor signal is generated; and evaluating the sensor signals by forming a mathematical linkage from the first sensor signal of the temperature sensor and the second sensor signal of the radiation sensor, wherein the mathematical linkage specifies the radiant flux.

19. A method for measuring a temperature of an exit window of a thermal radiation source via the temperatures sensor and the a radiant flux of emitted radiation of a thermal radiation source through an exit window via the radiation sensor, as claimed in claim 1, wherein a radiation change over time is generated by an electrical modulation of a radiation element of the thermal radiation source, which causes a temperature change over time in the radiation sensor and in the temperature sensor, and wherein the radiant flux is ascertained therefrom by a calibration.

* * * * *